United States Patent

[19]

Momose

[11] 4,043,225

[45] Aug. 23, 1977

[54] POWER SHIFT TRANSMISSION FOR MOTOR VEHICLES

[75] Inventor: Yutaka Momose, Toyota, Japan

[73] Assignee: Aisin Seiki Kabushiki Kaisha, Japan

[21] Appl. No.: 717,535

[22] Filed: Aug. 25, 1976

Related U.S. Application Data

[63] Continuation of Ser. No. 537,370, Dec. 30, 1974, abandoned.

[30] Foreign Application Priority Data

Dec. 29, 1973 Japan .......................... 49-365

[51] Int. Cl.$^2$ .................... F16H 57/10; F16H 37/00
[52] U.S. Cl. ........................ 74/761; 74/753; 74/740
[58] Field of Search ............ 74/761, 760, 759, 758, 74/740, 753

[56] References Cited

U.S. PATENT DOCUMENTS

| | | | |
|---|---|---|---|
| 2,078,130 | 4/1937 | Edwards | 74/761 X |
| 2,736,215 | 2/1956 | Swift | 74/759 |
| 3,073,183 | 1/1963 | Kelley | 74/759 X |
| 3,118,319 | 1/1964 | Straub | 74/759 X |
| 3,507,168 | 4/1970 | Carp | 74/763 X |
| Re. 24,619 | 3/1959 | Simpson | 74/761 |

Primary Examiner—Samuel Scott
Assistant Examiner—Lance W. Chandler
Attorney, Agent, or Firm—Oblon, Fisher, Spivak, McClelland & Maier

[57] ABSTRACT

A speed change gear system for industrial vehicles, includes a first planetary gear set having a first sun gear, a plurality of first planetary gears engaged with the first sun gear, a first ring gear interengaged with the first planetary gears, and a first carrier rotatably supporting the first planetary gears and connected with an input shaft, a second planetary gear set having a second sun gear connected with the first ring gear, a plurality of second planetary gears engaged with the second sun gear, a second ring gear interengaged with the second planetary gears and connected with the first sun gear, and a second carrier rotatably supporting the second planetary gears and connected with an output gear member. A brake member is also provided for simultaneously locking the first sun gear and the second ring gear to a gear casing and a clutch member is provided for directly connecting the second ring gear with the input shaft so that desired speed change stages may be obtained through selective actuation of the brake and clutch members. Another brake member may also be provided for imparting additional versatility to the system.

4 Claims, 2 Drawing Figures

POWER SHIFT TRANSMISSION FOR MOTOR VEHICLES

This is a continuation of application Ser. No. 537,370, filed Dec. 30, 1974, now abandoned.

BACKGROUND OF THE INVENTION

1. Field of the Invention

The present invention relates generally to speed change gear systems, and more particularly to a speed change gear system adapted for a power shift transmission mechanism of an industrial vehicle.

2. Description of the Prior Art

It is desirable that the gear type speed change mechanism utilized upon industrial vehicles, such as for example, fork lifts and shovel cars, should have speed ratios of 1:2:4 in a three-stage speed change gear train so that a shockless shifting and compact assembly may be available, and alternatively a speed ratio of 1:2 in a two-stage system.

In addition, the number of forward and rearward speeds as well as the gear ratios thereof should preferably be the same, since the frequency of use of such forward and rearward movements are approximately the same within such industrial vehicles.

SUMMARY OF THE INVENTION

Accordingly, it is an object of the present invention to provide the desired speed ratios within the speed change gear system of a power shift transmission.

Another object of the present invention is to provide such speed ratios within the speed change gear system whereby the first speed stage ratio will be 0.5, the second speed stage ratio will be 1.0, and the third speed stage ratio will be 2.0, such ratios being obtained in either forward or rearward operational modes.

According to the present invention, the speed change system may be easily changed from a three stage system to a two stage system simply by removing one of the brake elements and yet a speed ratio of 1:2 within the remaining two stages may be maintained.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF A PREFERRED EMBODIMENT

Figure 1:
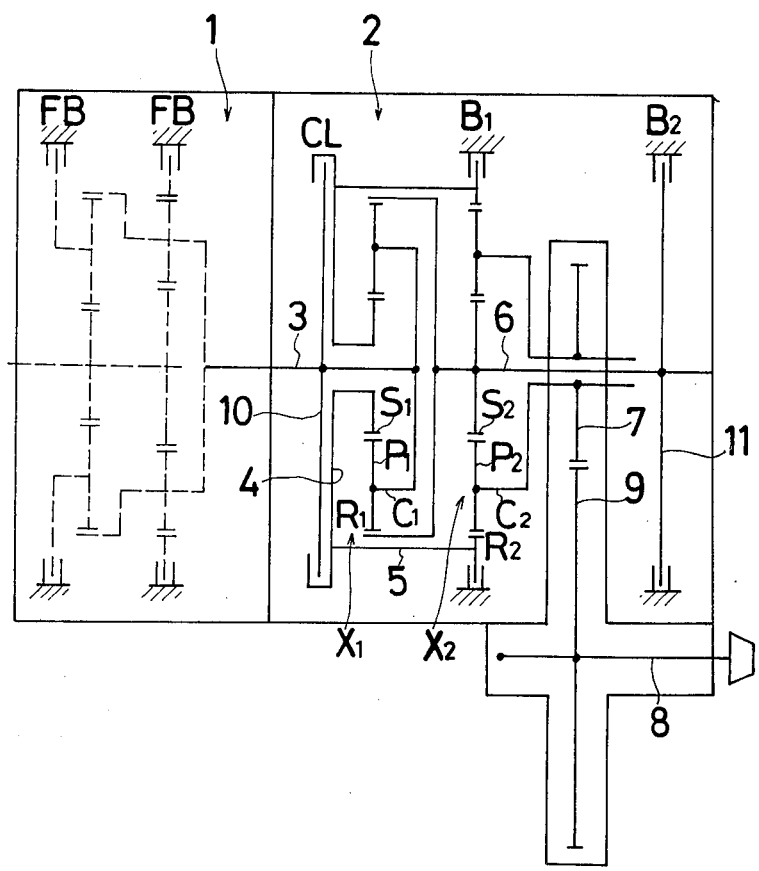
FIG. 1 is a schematic diagram of an embodiment of a speed change gear system, constructed in accordance with the present invention and showing its cooperative parts.

Referring now to the drawings and more particularly to FIG. 1 thereof, there is disclosed a speed change gear system wherein an input shaft 3 of a speed change gear train, generally indicated by the reference numeral 2, is connected with an output shaft, not shown, of a forward-rearward speed change gear train generally indicated by the reference character 1.

A first planetary gear set generally indicated by the reference character $X_1$ of the speed change gear train 2 is seen to include a first sun gear $S_1$, a plurality of first planetary pinion gears $P_1$ engaged with the first sun gear $S_1$, a first ring gear $R_1$ interengaged with the first planetary pinion gears $P_1$, and a first carrier $C_1$ rotatably supporting the first planetary pinion gears $P_1$, while a second planetary gear set, generally indicated by the reference character $X_2$, of the speed change gear train 2 similarly includes a second sun gear $S_2$, a plurality of second planetary pinion gears $P_2$ engaged with the second sun gear $S_2$, a second ring gear $R_2$ interengaged with the second planetary pinion gears $P_2$, and a second carrier $C_2$ rotatably supporting the second planetary pinion gears $P_2$.

The first sun gear $S_1$ is connected with the second ring gear $R_2$ through means of connecting members 4 and 5, while the first carrier $C_1$ is directly connected with the input shaft 3. The second sun gear $S_2$ is directly connected with an intermediate shaft 6 aligned coaxially with the input shaft 3 at an axial distance apart therefrom, while the second carrier $C_2$ is connected with an output gear 7 which is in turn engaged with another gear 9. The output gear 7 may be further connected with a power take-off mechanism, utilized for a winching operation or the like, and the latter gear 9 is further connected with an output shaft 8 disposed parallel to the intermediate shaft 6 at a radial distance apart therefrom and consequently, the two gears 7 and 9 as well as the output shaft 8 function as a counter-shaft train.

A clutch CL is provided so as to selectively couple or uncouple the input shaft 3 with the first sun gear $S_1$ and the second ring gear $R_2$ through means of a connecting member 10 which is directly connected with the input shaft 3, and through means of the connecting members 4 and 5 which are respectively connected with the first sun gear $S_1$ and the second ring gear $R_2$. In this manner, when the clutch CL is actuated, the first sun gear $S_1$ and the second ring gear $R_2$ are connected together for causing simultaneous rotation of the first and second planetary gear sets $X_1$ and $X_2$ whereby the rotational movements of the input shaft 3 which is connected with the first sun gear $S_1$ and that of the output gear 7 which is connected with the second carrier $C_2$ are synchronized.

A first brake $B_1$ is interposed between the second ring gear $R_2$ and a gear casing, not shown, so as to be capable of locking the second ring gear $R_2$ and the first sun gear $S_1$ to the casing when the brake $B_1$ is actuated, and a second brake $B_2$ is similarly interposed between the gear casing and a gear 11, which is fixedly connected with the intermediate shaft 6, so as to be capable of locking the first ring gear $R_1$ and the second sun gear $S_2$ to the gear casing as both elements are directly connected with the intermediate shaft 6.

As is shown in FIG. 1, the gear radius ratio between the first sun gear $S_1$ and the first ring gear $R_1$ is set to be 1:2 with respect to the input shaft 3 and that of the second sun gear $S_2$ relative to the second ring gear $R_2$ is also set to be 1:2 with respect to the intermediate shaft 6.

Accordingly, the rotational speed ratio of the first sun gear $S_1$ relative to the first ring gear $R_1$ is 2:1 and that of the second sun gear $S_2$ to that of the second ring gear $R_2$ is also 2:1, it also being of course remembered that the first ring gear $R_1$ is connected with the second sun gear $S_2$ and the first sun gear $S_1$ is connected with the second ring gear $R_2$.

Figure 2:
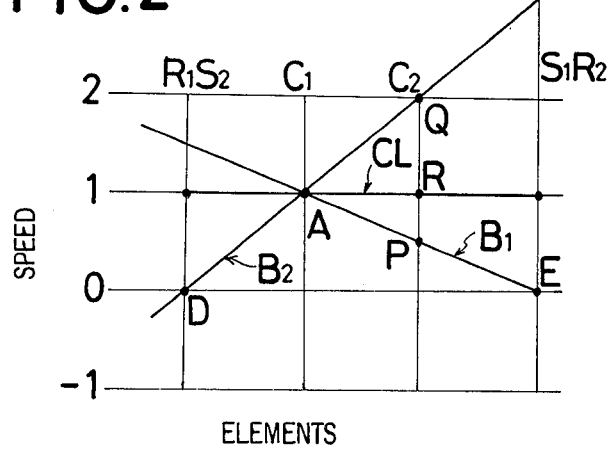
FIG. 2 is an operational diagram of each element of the system of FIG. 1 wherein the speeds of the elements are illustrated during the various operational stages of the transmission.

These relations concerning the rotational speed ratios of the various elements of the system are represented in FIG. 2, wherein the vertical axis represents the rotational speed of the elements, wherein it is assumed that the rotational speed of input shaft 3 is 1, while the horizontal axis represents the various elements of the planetary gear train.

Initially, the first carrier $C_1$ which is connected to the input shaft 3 is provisionally plotted on a vertical line $C_1$ and subsequently, the first sun gear $S_1$ and the first ring gear $R_1$ are settled so as to have a speed ratio of 2:1 with respect to the previously settled first carrier $C_1$. Accordingly, the second sun gear $S_2$ which is connected with the fist ring gear $R_1$, and the second ring gear $R_2$ which is connected with the first sun gear $S_1$ are respectively settled at the same values as those of the first ring gear $R_1$ and the first sun gear $S_1$ and thus, the first ring gear $R_1$ and the second sun gear $S_2$ are plotted on the same vertical line $R_1 S_2$ and the first sun gear $S_1$ and the second ring gear $R_2$ are similarly plotted on a vertical line $S_1 R_2$. The second carrier $C_2$ which is connected with the intermediate shaft 6 is plotted upon a vertical line $C_2$ which is interposed between the lines $R_1 S_2$ and $S_1 R_2$ so as to reflect the speed ratio 2:1 existing therebetween.

Assuming then that the rotational speed of the input shaft 3 is defined at a value of 1, then the rotational speed of the first carrier $C_1$ will be represented at a point A as seen in FIG. 2. Furthermore, when the first brake $B_1$ is actuated, the first sun gear $S_1$ and the second ring gear $R_2$ are locked to the gear casing and consequently the rotational speed of such elements is represented at a point E. Moreover, the rotational speed of the second carrier $C_2$ under such conditions, that is, when the first carrier $C_1$ is being rotated at a value of 1 and the first brake $B_1$ is actuated, is represented at a point P which is defined at the intersection point of lines A–E and line $C_2$, the rotational speed of the second carrier $C_2$ at this point P being read to be 0.5, whereby the rotational speed ratio of the second carrier $C_2$, and therefore the output gear 7 relative to the input shaft 3, is 0.5 and this is defined as the first speed change stage.

When the clutch CL is actuated while the rotational speed of the first carrier $C_1$ is 1, the first and second sun gears $S_1$ and $S_2$, and the first and second gears $R_1$ and $R_2$, are integrally rotated with the input shaft 3, and accordingly, the rotational speed of the second carrier $C_2$ is represented at a point R which designates a value of 1. It follows that the rotational speed ratio of the second carrier $C_2$ relative to the input shaft 3 and the first carrier $C_1$ is thus 1.0 and this is defined as the second speed change stage.

When the second brake $B_2$ is actuated while the rotational speed of the input shaft is 1, then the rotational speeds of the first ring gear $R_1$ and the second sun gear $S_2$ becomes zero as represented at point D in FIG. 2. The rotational speed of the second carrier $C_2$ under these conditions is represented at the point Q which is defined at the intersection point of the extension of the line D-A and the line $C_2$. This point Q is read to have a value of 2.0 as seen in FIG. 2 and thus, the rotational speed ratio of the second carrier $C_2$ relative to the input shaft 3 is now 2.0 and this is defined as the third speed change stage.

The results obtained from the diagram of FIG. 2 can be proved mathematically in accordance with the following formula characteristic of the planetary gear sets;

$$Nr - (1 + i) Nc + iNs = o \quad (1)$$

wherein $Nr$, $Nc$, and $Ns$ respectively represent the number of revolutions of the ring gear, the carrier member, and the sun gear, and $i$ represents the rotational radius ratio of the sun gear relative to the ring gear.

Assuming that the rotation of the input shaft 3 is defined as 1 and that the ratio $i$ is ½, then the formula characteristic of the first and second planetary gear sets $X_1$ and $X_2$ as disclosed within FIG. 1 may be stated as follows:

$$X_1: Nr_1 - (1+\tfrac{1}{2})1 + \tfrac{1}{2} Ns_1 = 0 \quad (2)$$

$$X_2: Nr_2 - (1+\tfrac{1}{2})Nc_2 + \tfrac{1}{2}Ns_2 = 0 \quad (3)$$

Under these conditions, when the first brake $B_1$ is actuated, the speed values of $Ns_1 Nr_2$ are zero and consequently, the two-above-noted formulas (2) and (3) can be rewritten as follows:

$$X_1: Nr_1 - (1+\tfrac{1}{2})1 + 0 = 0 \quad (4)$$

$$X_2: 0 - (1 + \tfrac{1}{2})Nc_2 + \tfrac{1}{2}Ns_2 = 0 \quad (5)$$

In addition, as the first ring gear $R_1$ and the second sun gear $S_2$ are connected with each other as shown in FIG. 1 the number of revolutions of such members are the same, and thus the value of $Nc_2$ amounts to ½ which value is shown at the point P of FIG. 2.

When the clutch CL is actuated, the speed values of $Nr_1$, $Ns_1$, $Nr_2$, and $Ns_2$ of the formulas (2) and (3) amount to 1 since the first and second planetary gears sets $X_1$ and $X_2$ rotate integrally and therefore, the value of $Nc_2$ in this case amounts to 1 which is shown at the point R of FIG. 2.

Similarly, when the second brake $B_2$ is actuated, the speed values of $Ns_2$ and $Nr_1$ are zero and therefore, the formulas (2) and (3) may be rewritten as follows:

$$X_1: 0 - (1 + \tfrac{1}{2})1 + \tfrac{1}{2} Ns_1 = 0 \quad (6)$$

$$X_2: Nr_2 - (1 + \tfrac{1}{2}) Nc_2 + 0 = 0 \quad (7)$$

As the first sun gear $S_1$ and the second ring gear $R_2$ are connected with each other through means of connecting members 4 and 5 as seen in FIG. 1, the speed values of $Ns_1$ and $Nr_2$ become the same and thus the value of $Nc_2$ amounts to 2.0 which is shown in FIG. 2 at the point Q.

These speed ratios of two or three-stage speed change gear systems may be obtained by selectively designing the dimensions of the elements of each of the first and second planetary gear sets $X_1$ and $X_2$ to be precisely the same, and defining each gear ratio of the sun gear to the ring gear to be ½. In order to obtain approximate speed change ratios of 1: 2:4, the gear dimensions of each elements need not be strictly designed, although under such conditions, the gear ratios of each sun gear to each ring gear should be maintained at ½.

It should be noted that at two-stage speed change system may be obtained by simply removing the second brake $B_2$ from the speed change gear train 2 of FIG. 1.

In addition, it can be further noted that even when the rotational speed from the engine, not shown, of the vehicle is reduced to, for example, about 0.33–0.5 at the forward-rearward speed change gear train 1, that is, when such reduced rotational speed is transmitted to the input shaft 3 of the speed change gear train 2, the rotational speed within the third speed change stage thereof would actually amount to a value comparable to the original rotational speed of the engine. Therefore, it is possible for the system of the present invention to largely reduce the rotational speed of the engine without any modifications or enlargement of the gear train.

Obviously, many modifications and variations of the present invention are possible in light of the above teachings. It is to be understood therefore that within the scope of the appended claims, the present invention may be practiced otherwise than as specifically described herein.

What is claimed as new and desired to be secured by Letters Patent of the United States is:

1. A power shift transmission for motor vehicles comprising:
    a first planetary gear set having a first sun gear, a plurality of first planetary pinion gears engaged with said first sun gear, a first ring gear interengaged with said first planetary pinion gears, and a first carrier rotatably supporting said first planetary pinion gears and permanently directly connected with an input shaft so as to always be driven by said input shaft.
    a second planetary gear set having a second sun gear, a plurality of a second planetary pinion gears engaged with said second sun gear, a second ring gear interengaged with said second planetary pinion gears, and a second carrier rotatably supporting said second planetary pinion gears and connected with an output gear member;
    said first sun gear being connected with said second ring gear and said first ring gear being connected with said second sun gear;
    a first brake means for simultaneously locking said first sun gear and said second gear to a gear casing; and
    a clutch means for directly connecting said second ring gear and said first sun gear with said input shaft.

2. A power shift transmission as set forth in claim 1, wherein;
    the dimensions of said gear elements of said first planetary gear set are the same as those of said second planetary gear set elements and each gear ratio of said first and second sun gears to said first and second ring gears is set to be 1:2.

3. A power shift transmission as set forth in claim 1, wherein:
    a second brake means is provided for locking said first ring gear and said second sun gear to said casing.

4. A power shift transmission as set forth in claim 1, wherein said input shaft is connected with an output shaft of a forward-rearward speed change gear train.

* * * * *